United States Patent
Shi et al.

(10) Patent No.: US 10,772,160 B2
(45) Date of Patent: Sep. 8, 2020

(54) RAN SERVER, WIRELESS COMMUNICATIONS SYSTEM, AND TERMINAL ATTACH METHOD

(71) Applicant: HUAWEI TECHNOLOGIES CO., LTD., Shenzhen, Guangdong (CN)

(72) Inventors: Xiaoli Shi, Shanghai (CN); Hongzhuo Zhang, Shanghai (CN); Wenjie Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/188,874

(22) Filed: Nov. 13, 2018

(65) Prior Publication Data
US 2019/0082500 A1    Mar. 14, 2019

Related U.S. Application Data

(63) Continuation of application No. PCT/CN2016/082139, filed on May 13, 2016.

(51) Int. Cl.
*H04W 88/18* (2009.01)
*H04W 88/08* (2009.01)
(Continued)

(52) U.S. Cl.
CPC ............ *H04W 88/18* (2013.01); *H04L 29/06* (2013.01); *H04W 4/029* (2018.02); *H04W 28/16* (2013.01);
(Continued)

(58) Field of Classification Search
CPC ............ H04W 36/0022; H04W 60/00; H04W 60/005
See application file for complete search history.

(56) References Cited

U.S. PATENT DOCUMENTS 9,877,346 B2 * 1/2018 Sedlacek ............... H04W 48/16
10,285,060 B2 * 5/2019 Nair ...................... H04W 60/00

FOREIGN PATENT DOCUMENTS

CN    101370177 A    2/2009
CN    102333386 A    1/2012
(Continued)

OTHER PUBLICATIONS

3GPP TS 23.251 V13.1.0 (Mar. 2015), 3rd Generation Partnership Project;Technical Specification Group Services and System Aspects;Network Sharing;Architecture and functional description(Release 13), Mar. 2015. 39 pages. XP050927720.
(Continued)

*Primary Examiner* — Chandrahas B Patel
(74) *Attorney, Agent, or Firm* — Fish & Richardson P.C.

(57) ABSTRACT

A RAN server, a wireless communications system, and a terminal attach method are provided. The RAN server configured to centrally manage base stations of a plurality of wireless communications standards is introduced, and the RAN server is used as a central node to implement a unified interface to a core network. A base station that is of any wireless communications standard and that is managed by the RAN server may independently provide a data transmission service to a terminal, so that the wireless communications system provided in this application basically does not cause an additional latency. In addition, a TAI unrelated to a wireless communications standard of a base station is carried in an attach request message, an attach accept message, and an attach complete message that are exchanged in a terminal attach process.

15 Claims, 9 Drawing Sheets

(51) Int. Cl.
| | |
|---|---|
| H04W 60/04 | (2009.01) |
| H04L 29/06 | (2006.01) |
| H04W 4/029 | (2018.01) |
| H04W 76/11 | (2018.01) |
| H04W 76/27 | (2018.01) |
| H04W 28/16 | (2009.01) |
| H04W 48/18 | (2009.01) |
| H04W 88/06 | (2009.01) |
| H04W 8/24 | (2009.01) |

(52) U.S. Cl.
CPC ............ *H04W 60/04* (2013.01); *H04W 76/11* (2018.02); *H04W 76/27* (2018.02); *H04W 88/08* (2013.01); *H04W 8/24* (2013.01); *H04W 48/18* (2013.01); *H04W 88/06* (2013.01); *H04W 88/182* (2013.01)

(56) References Cited

FOREIGN PATENT DOCUMENTS

| | | |
|---|---|---|
| CN | 103517247 A | 1/2014 |
| CN | 105050139 A | 11/2015 |
| WO | 2010142108 A1 | 12/2010 |
| WO | 2013000645 A1 | 1/2013 |

OTHER PUBLICATIONS

3GPP TR 38.801 V0.1.0 (Apr. 2016), 3rd Generation Partnership Project;Technical Specification Group Radio Access Network;Study on New Radio Access Technology;Radio Access Architecture and Interfaces(Release 14), Apr. 2016. 17 pages. XP051094946.

3GPP TSG-RAN WG3 Meeting #91bis, R3-160733, Nokia:"Key principles for RAN-CN Interface", Bangalore, India, Apr. 11-15, 2016. 7 pages. XP051082916.

Extended European Search Report issued in European Application No. 16901362.0 dated Mar. 6, 2019, 12 pages.

Nokia et al., "Key principles for RAN-CN Interface",3GPP TSG-RAN WG3 Meeting #91bis R3-160733,Bangalore, India, Apr. 11-15, 2016,total 7 pages.

International Search Report and Written Opinion issued in International Application No. PCT/CN2016/82139 dated Feb. 6, 2017, 13 pages.

3GPP TS 23.251 V13.0.0 (Dec. 2014), "3rd Generation Partnership Project; Technical Specification Group Services and System Aspects; Network Sharing; Architecture and functional description (Release 13)," Dec. 2014, 39 pages.

ETRI, ZTE, "Update of Solution 8.1 to support Non-3GPP access integration," SA WG2 Meeting #114, S2-161627; Sophia Antipolis, Apr. 11-15 2016, 3 pages.

Office Action issued in Chinese Application No. 201680085671.X dated Apr. 24, 2020, 20 pages (with English translation).

ZTE, "The function split between CU and DU," 3GPP TSG RAN WG3 #91bis, R3-160804; Bangalore, India, Apr. 11-15, 2016, 7 pages.

ZTE, "Next Generation Network Architecture with Access Independent Core," 3GPP TSG RAN3 #91bis, R3-160798; Bangalore, India, Apr. 11-15, 2016, 4 pages.

* cited by examiner

CONT. FROM FIG. 7A

CONT. FROM FIG. 7A

CONT. FROM FIG. 7A

S709. The terminal sends terminal capability information to the RAN server by using a base station of any wireless communications standard S710. The RAN server sends the terminal capability information to the 5G CN by using the interface, to update the terminal capability information on the 5G CN S711. The RAN server sends, based on security information that is in the initial context setup request message and that is supported by UE, a security mode command message to the terminal by using a base station of any wireless communications standard, to perform security activation S712. The terminal sends a security mode complete message to the RAN server by using a base station of any wireless communications standard, to indicate that the security activation is completed S713. The RAN server sends an RRC connection reconfiguration message to the terminal by using a base station of any wireless communications standard, to perform terminal resource reconfiguration S714. The terminal sends an RRC connection reconfiguration complete message to the RAN server by using a base station of any wireless communications standard, to indicate that the radio resource configuration is completed S715. The RAN server sends an initial context setup response message to the 5G CN by using the interface, to indicate that terminal context setup is completed S716. The terminal sends an uplink information transfer message to the RAN server by using a base station of any wireless communications standard, where the message includes a NAS attach complete message S717. The RAN server sends an uplink NAS transport Uplink NAS Transport message to the 5G CN by using the interface, where the message includes a NAS attach complete message

RAN SERVER, WIRELESS COMMUNICATIONS SYSTEM, AND TERMINAL ATTACH METHOD

CROSS-REFERENCE TO RELATED APPLICATIONS

This application is a continuation of International Application No. PCT/CN2016/082139, filed on May 13, 2016, the disclosure of which is hereby incorporated by reference in its entirety.

TECHNICAL FIELD

The present invention relates to the field of wireless communications, and in particular, to a radio access network (RAN) server, a wireless communications system, and a terminal attach method.

BACKGROUND

An era of a new radio access (NR) technology is approaching, and the industry mainly proposes architectures of the following two wireless communications systems to address a problem of how to couple the NR technology to an existing wireless communications standard technology.

An architecture of a first wireless communications system is shown in FIG. 1, which is a scenario in which a Long Term Evolution (LTE) technology is tightly coupled to the NR technology. In FIG. 1, an eNB (evolved Node B) represents a base station in an LTE system, an EPC (Evolved Packet Core, evolved packet core) represents a core network of the LTE system, an NR node represents a base station in an NR system, and the eNB is connected to the NR node by using an existing X5 interface. The tight coupling means that the NR node has no independent core network, and the NR node needs to transmit data with the help of the eNB in the LTE system. In such a tightly-coupled architecture, user equipment (UE) cannot directly access the core network by using the NR node, and instead, the UE needs to access the core network by using the eNB, causing an additional latency.

An architecture of a second wireless communications system is shown in FIG. 2, which is a scenario in which the LTE technology is loosely coupled to the NR technology. A fifth generation mobile communications technology (5-Generation, 5G) CN (core network) in FIG. 2 represents a core network of an NR system. The loose coupling means that an eNB and an NR node each have an independent core network. In such a loosely-coupled architecture, UE needs to use signaling of an LTE wireless communications standard to access the core network by using the eNB, and the UE needs to use signaling of another new wireless communications standard to access the core network by using the NR node. As a result, signaling is not unified, increasing signaling complexity.

Therefore, a new wireless communications system is required to resolve a problem that the foregoing two wireless communications systems respectively cause an additional latency and increase signaling complexity.

SUMMARY

This application provides a RAN server, a wireless communications system, and a terminal attach method, to resolve a problem that when an NR technology is coupled to an existing wireless communications standard technology, an additional latency is caused or signaling complexity is increased.

A first aspect of this application provides a RAN server. The RAN server is connected to a 5G core network by using an interface, and the RAN server is configured to manage base stations of a plurality of wireless communications standards. The RAN server includes a receiver and a transmitter.

In a terminal attach process, the receiver receives an attach request message that is from a terminal and forwarded by a first base station, where the first base station is any one of the base stations of the plurality of wireless communications standards; the transmitter sends the attach request message to the 5G core network by using the interface; the receiver receives, by using the interface, an attach accept message returned by the 5G core network in response to the attach request message; and the transmitter sends the attach accept message to the terminal by using a second base station, where the second base station is any one of the base stations of the plurality of wireless communications standards. The first base station and the second base station may be a same base station or may be different base stations.

In this application, the 5G core network is specially introduced into the NR technology, the RAN server that is configured to centrally manage the base stations of the plurality of wireless communications standards is introduced, and a unified interface from the RAN server to the 5G core network is implemented. The interface unification between the RAN server and the 5G core network may enable the terminal to access the 5G core network by using unified signaling regardless of a wireless communications standard of a base station that is managed by the RAN server.

In a possible design, the receiver further receives an RRC connection reconfiguration complete message that is from the terminal and forwarded by a third base station, where the RRC connection reconfiguration complete message is sent by the terminal after the terminal receives an RRC connection reconfiguration message carrying the attach accept message, and the third base station is any one of the base stations of the plurality of wireless communications standards; after the receiver receives the RRC connection reconfiguration complete message, the transmitter sends an initial context setup response message to the 5G core network by using the interface; then, the receiver receives an attach complete message that is from the terminal and forwarded by a fourth base station, where the fourth base station is any one of the base stations of the plurality of wireless communications standards; and the transmitter sends the attach complete message to the 5G core network by using the interface, so that the terminal is attached to the 5G core network.

In a possible design, the attach request message, the attach accept message, and the attach complete message include a TAI of the terminal, and the TAI may be a preset value unrelated to a wireless communications standard of a base station, or the TAI may be an identifier of the RAN server.

Such a design is made because designing the TAI as a value unrelated to a wireless communications standard of a base station allows the 5G CN to be unaware that the terminal is using a base station of which type of wireless communications standard to initiate the attach process. Therefore, an attach procedure of same signaling can be used regardless of a wireless communications standard of a base station that is used by the terminal to access the 5G core network, thereby achieving signaling unification.

In a possible design, to be compatible with existing UE that does not support an NR technology, the RAN server is connected to an EPC network by using an S1 interface; and a capability of the terminal may be carried in the attach request message received by the receiver. The capability of the terminal is used to describe a wireless communications standard supported by the terminal, so that if the capability of the terminal supports an NR wireless communications standard, the transmitter may send the attach request message to the 5G core network by using the interface; or if the capability of the terminal supports only an LTE wireless communications standard, the transmitter may send the attach request message to the EPC network by using the S1 interface.

In a possible design, the RAN server may further include a processor.

After the terminal successfully registers with the 5G core network, the receiver receives a service request that is from the terminal and forwarded by a fifth base station, where the fifth base station is any one of the base stations of the plurality of wireless communications standards; and the processor allocates, to the terminal, a sixth base station responsible for processing the service request, where the sixth base station is any one of the base stations of the plurality of wireless communications standards.

According to the foregoing implementation, after the terminal is successfully attached to the 5G core network, the terminal may use resources of base stations that are of all wireless communications standards and that are managed by the RAN server regardless of a wireless communications standard that is used by the terminal to register with the 5G core network. For example, after the terminal successfully registers, when receiving the service request of the terminal, the RAN server may allocate, based on a service type of the service request initiated by the terminal, a base station of a wireless communications standard suitable for processing the service type to the terminal.

In addition, a base station that is of any wireless communications standard and that is managed by the RAN server may independently provide a data transmission service to the terminal, so that an additional latency may be avoided.

In a possible design, the RAN server may have the following two types of protocol stacks:

A first type of protocol stack is used to merely implement functions of an access adaptation layer, an RRC layer, an IP layer, and a PDCP layer.

A second type of protocol stack is used to merely implement functions of an access adaptation layer, an RRC layer, and an IP layer.

The access adaptation layer has a function of allocating, to the terminal, a base station responsible for processing the service, a function of managing a tracking area list, and a function of paging when the terminal initiates the service request.

In a possible design, the interface may be a newly-defined interface or may be the existing S1 interface.

A second aspect of this application provides a wireless communications system. The system includes a 5G core network, at least one RAN server, and base stations of a plurality of wireless communications standards. The RAN server has a function of performing a behavior of the RAN server in the foregoing example of the first aspect. The base stations of the plurality of wireless communications standards are configured to forward an attach request message from a terminal to the RAN server. The 5G core network is configured to return, when receiving the attach request message sent by the RAN server, an attach accept message to the RAN server.

In a possible design, the RAN server is further configured to: manage a tracking area list, deliver the tracking area list, and generate security contexts of the base stations of the plurality of wireless communications standards.

In a possible design, the base stations of the plurality of wireless communications standards include an LTE base station, an NR base station, and a Wi-Fi base station.

In a possible design, when the RAN server is configured to merely implement functions of an access adaptation layer, an RRC layer, an Internet Protocol IP layer, and a PDCP layer,
the LTE base station and the NR base station are configured to implement functions of an RLC layer, a MAC layer, and a PHY; and
the Wi-Fi base station is configured to implement functions of the MAC layer and the PHY layer.

An advantage of such a protocol stack architecture is that, because a main function of the PDCP layer is encryption, implementation of the function of the PDCP layer on the RAN server can ensure unification of security keys of base stations managed by the RAN server. In addition, a higher protocol layer is implemented on the RAN server, and an underlying protocol layer is implemented on a base station, so that decoupling of the higher layer and the underlying layer is implemented, thereby facilitating protocol maintenance. Moreover, site deployment costs in the architecture are low, thereby reducing costs.

In a possible design, when the RAN server is configured to merely implement functions of an access adaptation layer, an RRC layer, and an IP layer,
the LTE base station and the NR base station are configured to implement functions of a PDCP layer, an RLC layer, a MAC layer, and a PHY; and
the Wi-Fi base station is configured to implement functions of the PDCP layer, the MAC layer, and the PHY layer.

In a possible design, when the RAN server is configured to merely implement functions of an access adaptation layer, an RRC layer, and an IP layer,
the LTE base station and the NR base station are configured to implement functions of the RRC layer, a PDCP layer, an RLC layer, a MAC layer, and a PHY; and
the Wi-Fi base station is configured to implement functions of the RRC layer, the PDCP layer, the MAC layer, and the PHY layer.

An advantage of such a protocol stack architecture is that each node is independently deployed, so that more flexible radio resource management can be implemented.

A third aspect of this application provides a terminal attach method. Devices used in the method include a RAN server, a 5G core network, and base stations of a plurality of wireless communications standards. The RAN server is connected to a 5G core network of a new radio access technology by using an interface. The RAN server is configured to manage the base stations of the plurality of wireless communications standards. For a specific procedure of the method, refer to the detailed descriptions in the foregoing system, and details are not described herein again.

The RAN server is introduced into the solution provided in this application and is configured to centrally manage the base stations of the plurality of wireless communications standards, and the RAN server is used as a central node to implement a unified interface to a core network. A base station that is of any wireless communications standard and that is managed by the RAN server may independently provide a data transmission service to the terminal, so that the wireless communications system provided in this application basically does not cause an additional latency. In addition, the attach request message, the attach accept message, and the attach complete message that are in the terminal attach process carry a TAI unrelated to a wireless communications standard of a base station. This allows the 5G CN to be unaware that the terminal is using a base station of which type of wireless communications standard to initiate the attach process. Therefore, an attach procedure with same signaling can be used regardless of a wireless communications standard of a base station that is used by the terminal to access the 5G CN, thereby achieving signaling unification.

BRIEF DESCRIPTION OF DRAWINGS

FIG. 7A and FIG. 7B are a flowchart of a terminal attach method according to this application.

DESCRIPTION OF EMBODIMENTS

An NR technology is still in a phase of researching, and problems such as whether the NR technology needs to have a core network independent from another wireless communications standard, what type of protocol stack needs to be used in the NR technology, and what type of air interface technology needs to be used in the NR technology are still in discussion.

Figure 1:
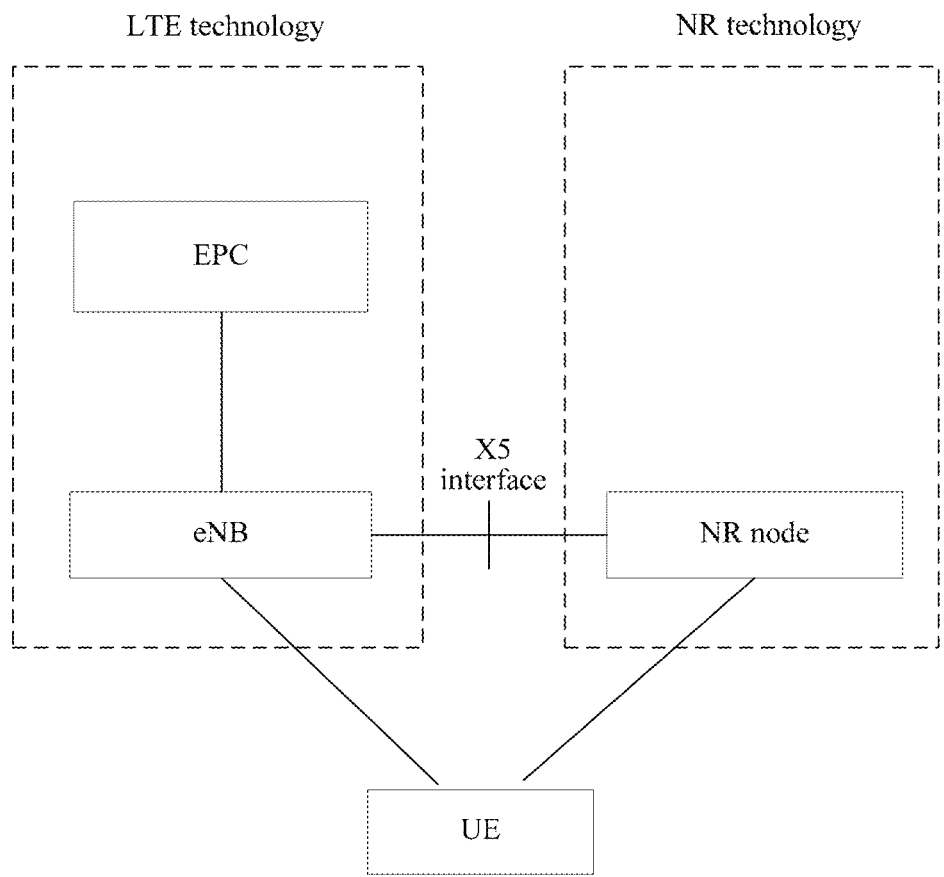
FIG. 1 is a schematic diagram of an architecture of a wireless communications system in the prior art.

If the NR technology has no independent core network, a possible architecture of a wireless communications system is shown in FIG. 1. The architecture is a tightly-coupling scenario, and in the architecture, UE cannot independently access a core network by using an NR node, but needs to access the core network by using an eNB in an LTE system. As a result, a particular latency is caused to a bearer on the NR node side by an X5 interface between the NR node and the eNB, and a longer latency is caused particularly when the X5 interface is not ideal.

Figure 2:
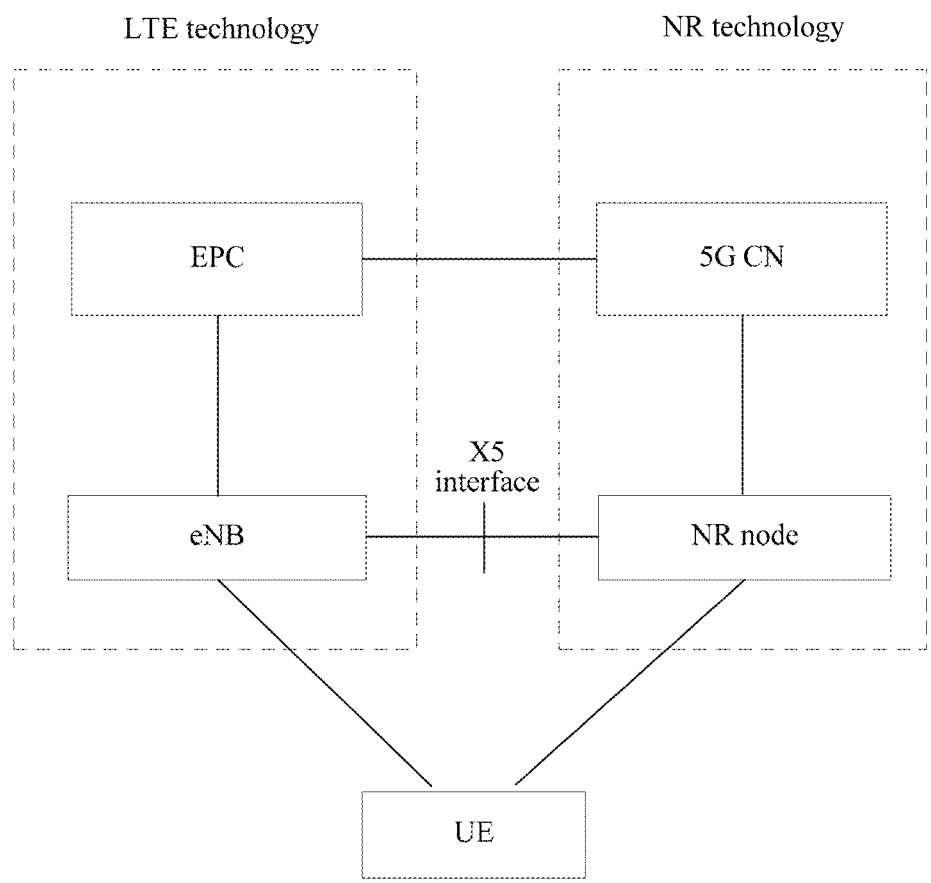
FIG. 2 is a schematic diagram of an architecture of another wireless communications system in the prior art.

If a core network is specially introduced into the NR technology, a possible architecture of a wireless communications system is shown in FIG. 2. The architecture is a loosely-coupling scenario, and in the architecture, there is a new interface between an NR node and a 5G CN. A wireless communications standard of the new interface is independent from an existing LTE wireless communications standard, so that if UE accesses a core network by using an eNB, the UE needs to use signaling of the LTE wireless communications standard. If the UE accesses the core network by using the NR node, the UE needs to use signaling of another new wireless communications standard. As a result, signaling is not unified.

This application provides a RAN server, a wireless communications system, and a terminal attach method, to resolve a problem that when the NR technology provided above is coupled to an existing wireless communications standard technology, either an additional latency is caused or signaling complexity is increased.

The following describes the technical solutions of the present invention with reference to the accompanying drawings and the embodiments of this specification.

Figure 3:
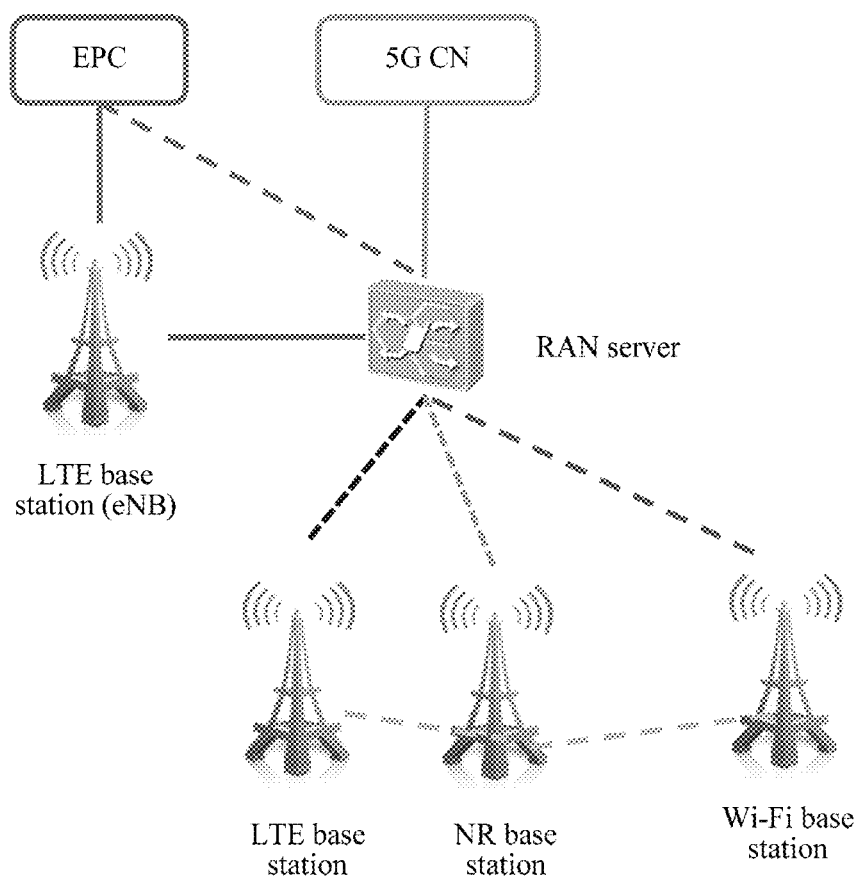
FIG. 3 is a schematic diagram of an architecture of a wireless communications system according to this application.

This application provides a wireless communications system. As shown in FIG. 3, in this application, a new core network, that is, a 5G CN is specially introduced into an NR technology, and a RAN server configured to centrally manage base stations of a plurality of wireless communications standards, for example, an LTE base station, an NR base station, and a Wireless Fidelity (Wireless Fidelity, Wi-Fi) base station in FIG. 3 is introduced. The RAN server is connected to the 5G CN by using a unified interface.

In the architecture, the RAN server is used as a central node, to implement a unified interface to the core network. The interface is an interface from the RAN server to the core network. Functions related to access of the core network are implemented at an access adaptation layer (Access Adapter Layer) of the RAN server.

In addition, to be compatible with existing UE that does not support the NR technology, for example, to be compatible with conventional UE that supports only the third generation mobile communications technology (3rd-Generation, 3G) or LTE, the RAN server may be further connected to a core network in an existing wireless communications system. For example, the RAN server shown in FIG. 3 may be connected to a conventional EPC network.

It should be noted that the 5G CN may have at least one RAN server. For brevity, FIG. 3 shows only one RAN server.

The wireless communications standards of the base stations managed by the RAN server may include, but are not limited to: Global System for Mobile Communications (Global System for Mobile communications, GSM), Code Division Multiple Access (Code Division Multiple Access, CDMA) IS-95, Code Division Multiple Access (Code Division Multiple Access, CDMA) 2000, Time Division-Synchronous Code Division Multiple Access (Time Division-Synchronous Code Division Multiple Access, TD-SCDMA), Wideband Code Division Multiple Access (Wideband Code Division Multiple Access, WCDMA), time division duplex-Long Term Evolution (Time Division Duplex-Long Term Evolution, TDD LTE), frequency division duplex-Long Term Evolution (Frequency Division Duplex-Long Term Evolution, FDD LTE), Long Term Evolution Advanced (Long Term Evolution-Advanced, LTE-advanced), a personal handy-phone system (Personal Handy-phone System, PHS), Wireless Fidelity (Wireless Fidelity, Wi-Fi) stipulated in 802.11-series protocols, Worldwide Interoperability for Microwave Access (Worldwide Interoperability for Microwave Access, WiMAX), and various future evolved wireless communications systems such as NR. FIG. 3 shows only base stations of three types of wireless communications standards, namely, an LTE base station, an NR base station, and a Wi-Fi base station. It should be understood that this does not constitute limitation on the protection scope of this application.

The wireless communications system provided in this application mainly includes three types of nodes, namely, a RAN server, base stations that are of a plurality of wireless communications standards and that are managed by the RAN server, and a 5G CN. The following describes functions of the three types of nodes in a terminal attach process, interfaces between the nodes, and protocol stacks of the nodes.

First: The functions of the nodes in the terminal attach process (1) The base stations that are of the plurality of wireless communications standards and that are managed by the RAN server are configured to forward a message, for example, an attach request message, a Radio Resource Control (Radio Resource Control, RRC) connection reconfiguration complete message, or an attach complete message, from the terminal to a new core network; and forward a message, for example, an attach accept message, from the new core network to the terminal.

In the terminal attach process, a message between the terminal and the RAN server may be forwarded by using a base station of any wireless communications standard, and different messages between a same terminal and the RAN server may be forwarded by using base stations of different wireless communications standards. For example, a terminal forwards an attach request message to a RAN server by using an LTE base station. Subsequently, when the terminal moves to a range covered by a Wi-Fi base station, the RAN server may send an attach accept message to the terminal by using the Wi-Fi base station.

In addition, after the terminal successfully registers with a 5G CN, the RAN server may automatically allocate, based on a specific service type, a base station of a proper wireless communications standard to the terminal.

In this application, a base station that is of any wireless communications standard and that is managed by the RAN server may independently provide a data transmission service to the terminal, so that the wireless communications system provided in this application basically does not cause an additional latency.

(2) The RAN server may be referred to as a RAN controller, or may be referred to as a central apparatus/unit (Central Unit).

In the terminal attach procedure, the RAN server may be configured to receive an attach request message that is from the terminal and forwarded by a base station. Regardless of a wireless communications standard of the base station forwarding the message from the terminal, the RAN server sends the attach request message to the 5G CN by using a unified interface between the RAN server and the 5G CN. In addition, the RAN server receives, by using the interface, an attach accept message returned by the 5G CN in response to the attach request message, and returns the attach accept message to the terminal by using a base station of any wireless communications standard.

Optionally, the RAN server may be further configured to: receive an RRC connection reconfiguration complete message that is from the terminal and forwarded by a base station of any wireless communications standard, where the RRC connection reconfiguration complete message is sent by the terminal after the terminal receives an RRC connection reconfiguration message carrying the attach accept message; after receiving the RRC connection reconfiguration complete message, send an initial context setup response message to the 5G CN by using the interface; receive an attach complete message that is from the terminal and forwarded by the base station of any wireless communications standard; and send the attach complete message to the 5G CN by using the interface, so that the terminal is attached to the 5G CN.

In this application, after the terminal is successfully attached to the 5G CN, the terminal may use resources of base stations that are of all wireless communications standards and that are managed by the RAN server regardless of a wireless communications standard that is used by the terminal to register with the 5G CN. For example, after the terminal successfully registers, when receiving a service request of the terminal, the RAN server may allocate a base station of any wireless communications standard to the terminal to process the service request of the terminal. Preferably, the RAN server may allocate, to the terminal based on a service type of the service request initiated by the terminal, a base station of a wireless communications standard suitable for processing the service type.

Optionally, the RAN server may be further configured to manage a tracking area (Tracking Area, TA) list, deliver the TA list, and generate security contexts of the base stations that are of the plurality of wireless communications standards and that are managed by the RAN server.

Optionally, the RAN server may implement functions of an existing Packet Data Convergence Protocol (Packet Data Convergence Protocol, PDCP) layer, for example, header compression and encryption. In addition, the RAN server may further implement functions of an RRC layer, for example, measurement control, broadcast, and paging.

Optionally, the attach request message received by the RAN server may carry a capability of the terminal, and the capability is used to indicate a wireless communications standard supported by the terminal. If the capability of the terminal supports an NR wireless communications standard, the RAN server sends the attach request message to the 5G CN; or if the capability of the terminal supports only the LTE wireless communications standard, the RAN server sends the attach request message to an LTE core network, that is, an EPC.

(3) The 5G CN may also be referred to as a new core network (new core) and is configured to return, when receiving the attach request message sent by the RAN server, the attach accept message to the RAN server.

Optionally, the 5G CN may also be configured to manage the TA list.

To be specific, a TA list management function may be implemented by the RAN server side, or may remain on the core network side. However, it should be noted that, in this application, a tracking area identity (TA Identity, TAI) included in the TA list is a preset value unrelated to a wireless communications standard of a base station, or is an identifier of the RAN server.

Such a design is made because a TAI is carried in each of the attach request message, the attach accept message, and the attach complete message, and designing the TAI as a value unrelated to a wireless communications standard of a base station allows the 5G CN to be unaware that the terminal is using a base station of which type of wireless communications standard to initiate the attach process. Therefore, an attach procedure with same signaling can be used regardless of a wireless communications standard of a base station that is used by the terminal to access the 5G CN, thereby achieving signaling unification.

In this application, the NR CN and the RAN server may evolve independently.

Second: The interfaces between the nodes

An interface between the RAN server and the 5G CN may be referred to as an "Ng1 interface", and the Ng1 interface may be a newly-defined interface, or may be an existing interface, for example, may be an interface similar to an S1 interface between an existing eNB and the EPC. This is not limited in the present invention.

An interface between the RAN server and base stations that are of various wireless communications standards and that are managed by the RAN server may be referred to as an "Xr interface", and the Xr interface may be implemented through standardization, or may be implemented through productization.

An interface between RAN servers may be similar to an X2 interface between existing eNBs.

An interface between the RAN server and the EPC may be referred to as an "Sy interface", and the Sy interface may be a newly-defined interface, or may be an existing interface, for example, may be an interface similar to the S1 interface.

An interface between base stations that are of a plurality of wireless communications standards and that are managed by the RAN server may be configured to transfer user plane data between the base stations, and the interface may be implemented through standardization, or may be implemented through productization.

Third: The protocol stacks of the nodes

A protocol stack architecture of a node may be implemented in the following three possible implementations in this application.

Figure 4:
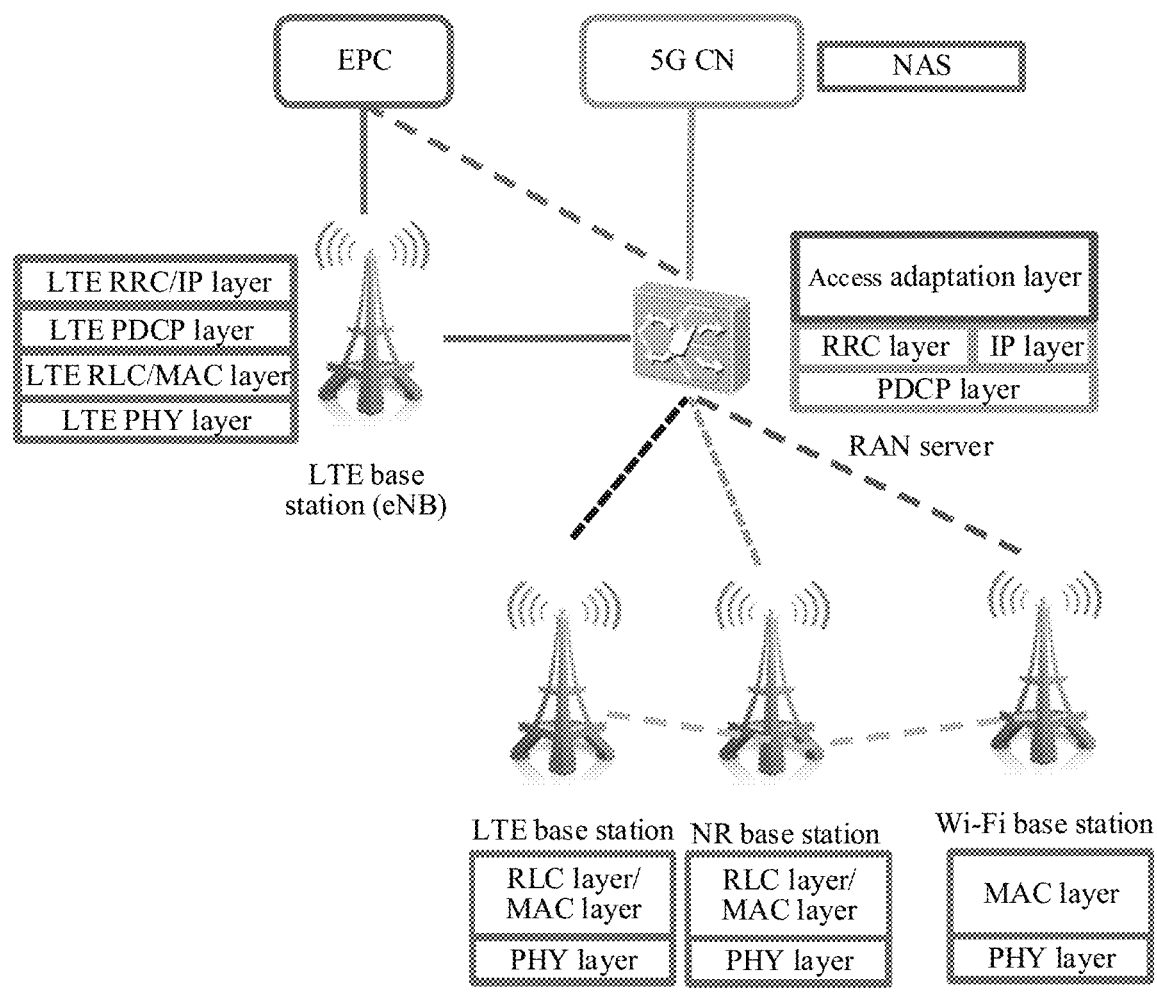
FIG. 4 is a schematic diagram of an architecture of a protocol stack of a first wireless communications system according to this application.

(1) A first type of protocol stack architecture is shown in FIG. 4 and is specifically as follows:

A 5G CN is configured to implement a function of a non-access stratum (Non-access stratum, NAS). When accessing the 5G CN by using different wireless communications standard technologies, a terminal in this application uses a same signaling procedure. Therefore, it can be considered that the NAS of the 5G CN is a single (single) NAS.

A RAN server is configured to implement functions of an access adaptation layer, an RRC layer, an Internet Protocol (Internet Protocol, IP) layer, and a PDCP layer.

The access adaptation layer has a function of allocating, to the terminal, a base station responsible for processing the service, a function of managing a tracking area list, and a function of paging when the terminal initiates the service request.

Optionally, the access adaptation layer and the RRC layer may be a same protocol layer, or may be two independent protocol layers.

It should be noted that a conventional RRC layer performs radio resource management (English: Radio Resource Management, RRM), RRM measurement configuration, and the like only for a specific standard, but the RRC layer in this application may perform RRM, RRM measurement configuration, and the like for various standards.

A base station managed by the RAN server is configured to implement functions of a Radio Link Control (RLC) layer, a Media Access Control (MAC) layer, and a physical (PHY) layer.

Specially, base stations of some wireless communications standards, for example, a Wi-Fi base station, may merely need to be configured to implement functions of the MAC layer and the PHY layer.

An advantage of the first type of protocol stack architecture is that, because a main function of the PDCP layer is encryption, implementation of the function of the PDCP layer on the RAN server may ensure unification of security keys of base stations managed by the RAN server. In addition, a higher protocol layer is implemented on the 5G CN and the RAN server, and an underlying protocol layer is implemented on a base station, so that decoupling of the higher layer and the underlying layer is implemented, thereby facilitating protocol maintenance. Moreover, site deployment costs in the architecture are low, thereby reducing costs.

Figure 5:
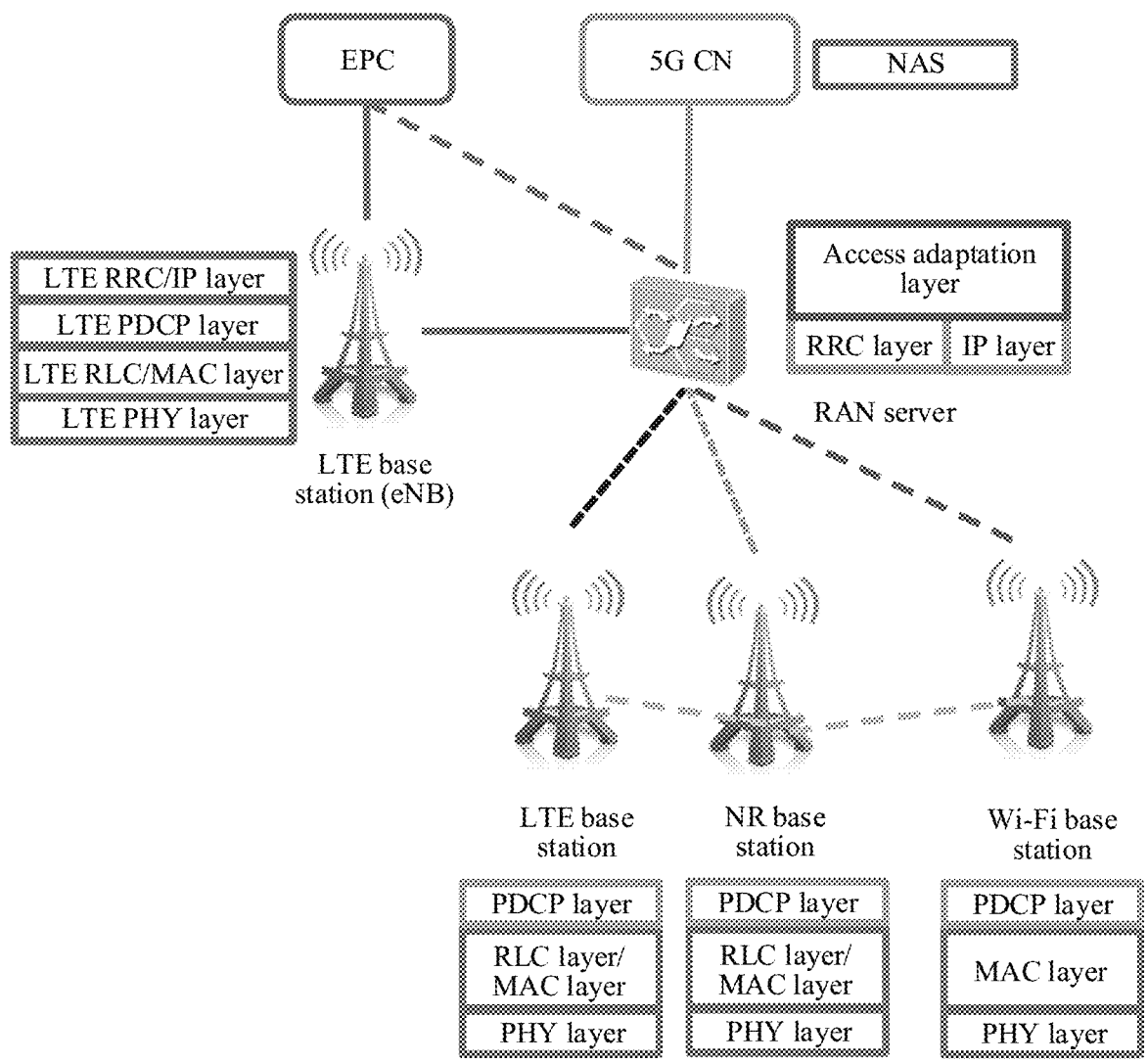
FIG. 5 is a schematic diagram of an architecture of a protocol stack of a second wireless communications system according to this application.

(2) A second type of protocol stack architecture is shown in FIG. 5 and is specifically as follows:

A 5G CN is configured to implement a function of a NAS.

A RAN server is configured to implement functions of an access adaptation layer, an RRC layer, and an IP layer.

A base station managed by the RAN server is configured to implement functions of a PDCP layer, an RLC layer, a MAC layer, and a PHY layer.

Specially, base stations of some wireless communications standards, for example, a Wi-Fi base station, may merely need to be configured to implement functions of the PDCP layer, the MAC layer, and the PHY layer.

The second type of protocol stack architecture is different from the first type of protocol stack architecture mainly in that, in the second type of protocol stack architecture, the function of the PDCP layer is implemented by the base station.

Figure 6:
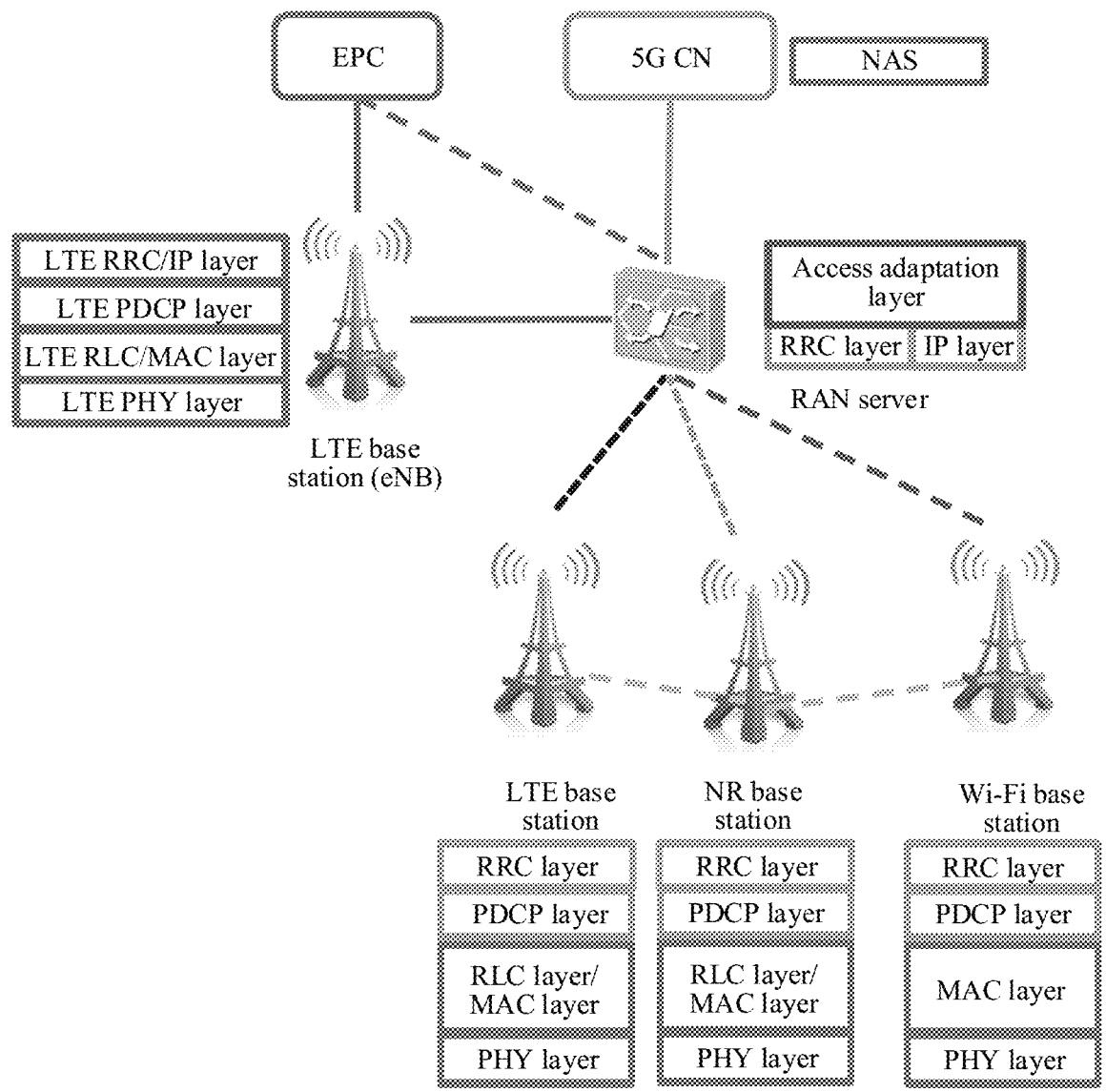
FIG. 6 is a schematic diagram of an architecture of a protocol stack of a third wireless communications system according to this application.

(3) A third type of protocol stack architecture is shown in FIG. 6 and is specifically as follows:

A 5G CN is configured to implement a function of a NAS.

A RAN server is configured to implement functions of an access adaptation layer, an RRC layer, and an IP layer. The access adaptation layer and the RRC layer on the RAN server may be a same protocol layer, or may be two independent protocol layers. In addition, the RRC layer has some RRC functions, for example, an interference coordination function.

A base station managed by the RAN server is configured to implement functions of the RRC layer, a PDCP layer, an RLC layer, a MAC layer, and a PHY layer.

Specially, base stations of some wireless communications standards, for example, a Wi-Fi base station, may merely need to be configured to implement functions of the RRC layer, the PDCP layer, the MAC layer, and the PHY layer.

A difference between the third type of protocol stack architecture and the second type of protocol stack architecture mainly lies in that some functions of the RRC layer are implemented on the RAN server, for example, a TA list management function and a measurement control function. In addition, some other functions of the RRC layer, for example, a paging function and a broadcast function, are implemented on the base station managed by the RAN server.

An advantage of the third type of protocol stack architecture is that each node is independently deployed, so that more flexible radio resource management can be implemented. However, deployments costs may be relatively high.

Figure 7A:
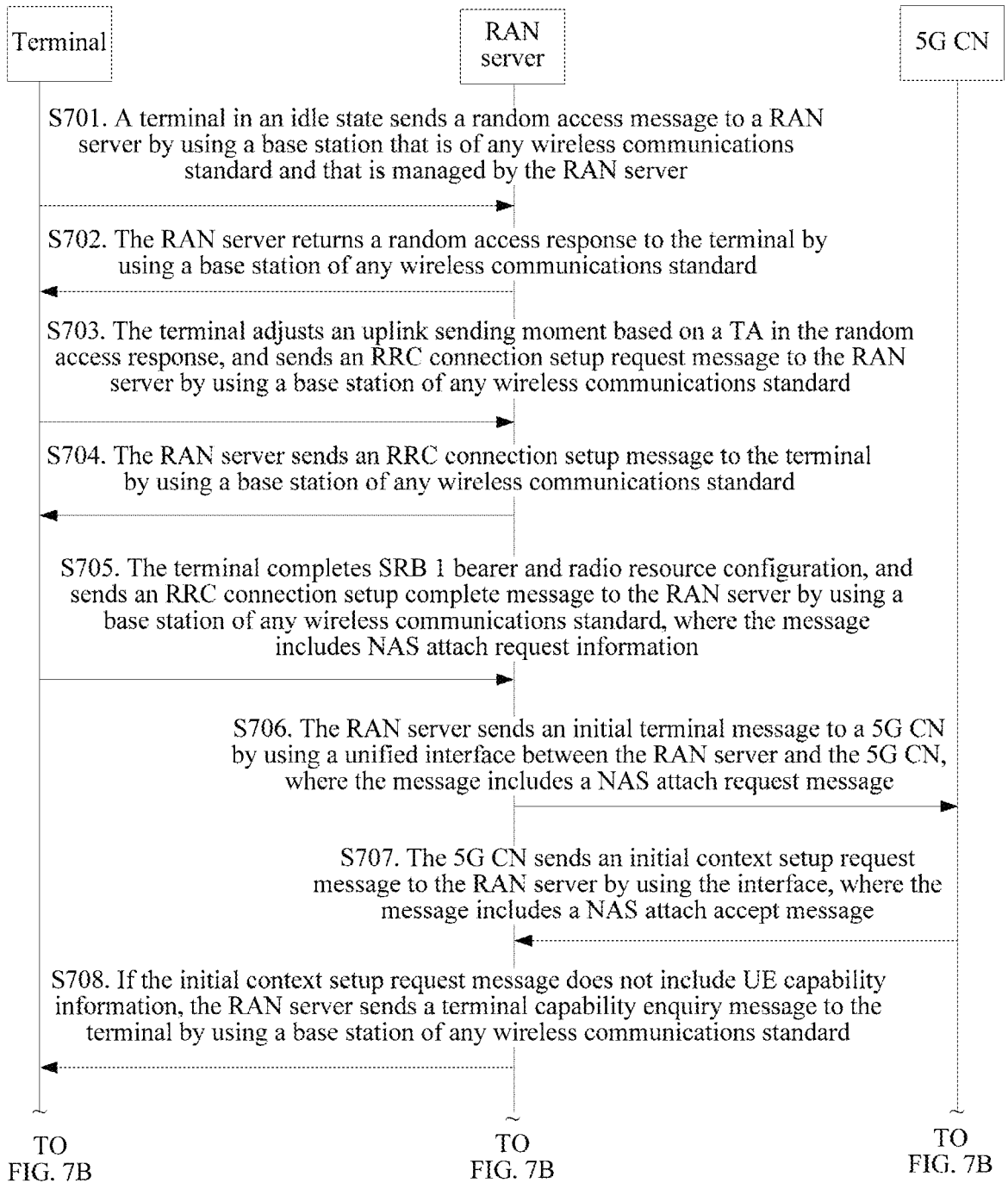

Based on the wireless communications system provided above, this application further provides a terminal attach method. As shown in FIG. 7A and FIG. 7B, the method includes the following steps.

Step 701: When an attach process is to be performed on a terminal in an idle state, first send a random access message to a RAN server by using a base station that is of any wireless communications standard and that is managed by the RAN server.

Step 702: After receiving the random access message, the RAN server returns a random access response to the terminal by using a base station of any wireless communications standard.

Step 703: After receiving the random access response, the terminal adjusts an uplink sending moment based on a TA in the random access response, and sends an RRC connection setup request message to the RAN server by using a base station of any wireless communications standard.

Step 704: The RAN server sends an RRC connection setup message to the terminal by using a base station of any wireless communications standard, where the message includes information about a signaling radio bearer (SRB) 1 and information about radio resource configuration.

Step 705: The terminal completes setup of the SRB 1 bearer and the radio resource configuration, and sends an RRC connection setup complete message to the RAN server by using a base station of any wireless communications standard, where the message includes NAS attach request (Attach Request) information.

Optionally, the attach request message may carry a capability of the terminal, and the RAN server may determine, based on the capability of the terminal carried in the attach request message, a wireless communications standard supported by the terminal. The RAN server can continue to perform subsequent steps 706 to 717 only when determining that the terminal supports a wireless communications standard of a New RAT.

Optionally, the RAN server may be connected to an EPC network in an LTE system by using an S1 interface. If the RAN server determines, based on the capability of the terminal carried in the attach request message, that the terminal supports only an LTE wireless communications standard, the RAN server may send the attach request message to the EPC network by using the S1 interface. For a subsequent procedure, refer to a terminal attach procedure in an existing LTE system, but a difference lies in that functions of an eNB in the terminal attach process in the LTE system are all performed on the RAN server.

Step 706: The RAN server sends an initial terminal message (Initial UE Message) to a 5G CN by using a unified interface between the RAN server and the 5G CN, where the message includes a NAS attach request message.

Optionally, a unified interface between the RAN server and a CN of a New RAT may be a newly-defined interface, or may be an existing legacy interface such as the S1 interface.

Step 707: The 5G CN sends an initial context setup request message to the RAN server by using the interface, where the message includes a NAS attach accept message.

Step 708: After the RAN server receives the initial context setup request message, if the message does not include UE capability information, the RAN server sends a terminal capability enquiry (UE Capability Enquiry) message to the terminal by using a base station of any wireless communications standard to enquiry a UE capability.

Step 709: The terminal sends terminal capability information (UE capability information) to the RAN server by using a base station of any wireless communications standard, to report the terminal capability information.

It should be noted that the terminal capability message in step 708 and step 709 may be carried in the attach request message in step 705, and if so, step 708 and step 709 may be omitted.

Step 710: The RAN server sends the terminal capability information to the 5G CN by using the interface, to update the terminal capability information on the 5G CN.

Step 711: The RAN server sends, based on security information that is in the initial context setup request message and that is supported by UE, a security mode command message to the terminal by using a base station of any wireless communications standard, to perform security activation.

Step 712: The terminal sends a security mode complete message to the RAN server by using a base station of any wireless communications standard, to indicate that the security activation is completed.

Step 713: The RAN server sends, based on radio access bearer setup information in the initial context setup request message, an RRC connection reconfiguration message to the terminal by using a base station of any wireless communications standard, to perform terminal resource reconfiguration, including reconfiguration of the SRB 1 signaling bearer information and reconfiguration of the radio resource configuration, setup of an SRB 2 and a data radio bearer (DRB), and the like.

Step 714: The terminal sends an RRC connection reconfiguration complete message to the RAN server by using a base station of any wireless communications standard, to indicate that the radio resource configuration is completed.

Step 715: The RAN server sends an initial context setup response message to the 5G CN by using the interface, to indicate that terminal context setup is completed.

Step 716: The terminal sends an uplink information transfer message to the RAN server by using a base station of any wireless communications standard, where the message includes a NAS attach complete message.

Step 717: The RAN server sends an uplink NAS transport Uplink NAS Transport message to the 5G CN by using the interface, where the message includes a NAS attach complete message.

Optionally, after the terminal is attached to the core network of the New RAT, the terminal may send a service request to the RAN server by using a base station of any wireless communications standard, and the RAN server may allocate a base station of any wireless communications standard to the terminal to process the service request of the terminal.

Optionally, the attach request message, the attach accept message, and the attach complete message include a TAI of the terminal, and the TAI may be a preset value unrelated to a wireless communications standard of a base station, or may be an identifier of the RAN server.

The terminal in this application may be a wireless terminal. The wireless terminal may be a device that provides a user with voice and/or data connectivity, a handheld device having a wireless connection function, or another processing device connected to a wireless modem. The wireless terminal may communicate with one or more core networks through a radio access network. The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a subscriber unit, a subscriber station, a mobile station, a mobile console, a remote station, an access point, a remote terminal, an access terminal, a user terminal, a user agent, a user device, or user equipment.

Figure 8:
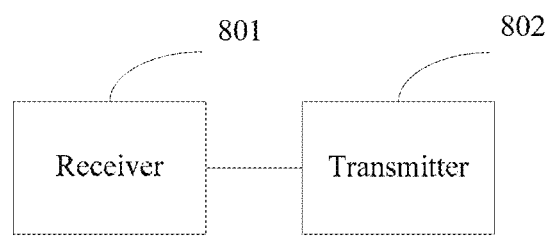
FIG. 8 is a schematic structural diagram of a RAN server according to this application.

This application further provides a RAN server. The RAN server is connected to a 5G core network by using an interface, and the RAN server is configured to manage base stations of a plurality of wireless communications standards. As shown in FIG. 8, the RAN server includes a receiver 801 and a transmitter 802.

The receiver 801 is configured to receive an attach request message that is from a terminal and forwarded by a first base station, where the first base station is any one of the base stations of the plurality of wireless communications standards.

The transmitter 802 is configured to send the attach request message to the 5G core network by using the interface.

The receiver 801 is further configured to receive, by using the interface, an attach accept message returned by the 5G core network in response to the attach request message.

The transmitter 802 is further configured to send the attach accept message to the terminal by using a second base station, where the second base station is any one of the base stations of the plurality of wireless communications standards.

Optionally, the receiver 801 is further configured to receive an RRC connection reconfiguration complete message that is from the terminal and forwarded by a third base station, where the RRC connection reconfiguration complete message is sent by the terminal after the terminal receives an RRC connection reconfiguration message carrying the attach accept message, and the third base station is any one of the base stations of the plurality of wireless communications standards.

The transmitter 802 is further configured to: after the receiver receives the RRC connection reconfiguration complete message, send an initial context setup response message to the 5G core network by using the interface.

The receiver 801 is further configured to receive an attach complete message that is from the terminal and forwarded by a fourth base station, where the fourth base station is any one of the base stations of the plurality of wireless communications standards.

The transmitter 802 is further configured to send the attach complete message to the 5G core network by using the interface, so that the terminal is attached to the 5G core network.

Optionally, the attach request message, the attach accept message, and the attach complete message include a TAI of the terminal, and the TAI is a preset value unrelated to a wireless communications standard of a base station, or the TAI is an identifier of the RAN server.

Optionally, the RAN server is connected to an EPC network of an LTE system by using an S1 interface, and the attach request message carries a capability of the terminal.

Optionally, that the transmitter sends the attach request message to the 5G core network by using the interface specifically includes: if the capability of the terminal supports an NR wireless communications standard, the transmitter 802 sends the attach request message to the 5G core network by using the interface; or if the capability of the terminal supports only an LTE wireless communications standard, the transmitter 802 sends the attach request message to the EPC network by using the S1 interface.

Optionally, the RAN server may further include a processor.

The receiver 801 may be further configured to receive a service request that is from the terminal and forwarded by a fifth base station, where the fifth base station is any one of the base stations of the plurality of wireless communications standards.

The processor is configured to allocate, to the terminal, a sixth base station responsible for processing the service request, where the sixth base station is any one of the base stations of the plurality of wireless communications standards.

Optionally, the RAN server may be configured to merely implement functions of an access adaptation layer, an RRC layer, an IP layer, and a PDCP layer. Alternatively, the RAN server may be configured to merely implement functions of an access adaptation layer, an RRC layer, and an IP layer, where the access adaptation layer has a function of allocating, to the terminal, a base station responsible for processing the service, a function of managing a tracking area list, and a function of paging when the terminal initiates the service request.

Optionally, the interface between the RAN server and the NR CN may be a newly-defined interface, or the interface may be the S1 interface.

It should be noted that the first base station, the second base station, the third base station, the third base station, the fourth base station, the fifth base station, and the sixth base station may be a same base station, or may be different base stations.

In conclusion, the RAN server is introduced into the technical solution provided in this application and is configured to centrally manage the base stations of the plurality of wireless communications standards, and the RAN server is used as a central node to implement a unified interface to a core network. A base station that is of any wireless communications standard and that is managed by the RAN server may independently provide a data transmission service to the terminal, so that the wireless communications system provided in this application basically does not cause an additional latency. In addition, the attach request message, the attach accept message, and the attach complete message that are in the terminal attach process carry a TAI unrelated to a wireless communications standard of a base station. This allows the 5G CN to be unaware that the terminal is using a base station of which type of wireless communications standard to initiate the attach process. Therefore, an attach procedure with same signaling can be used regardless of a wireless communications standard of a base station that is used by the terminal to access the 5G CN, thereby achieving signaling unification.

Persons skilled in the art should understand that the embodiments of the present invention may be provided as a method, a system, or a computer program product. Therefore, the present invention may use a form of hardware-only embodiments, software-only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A radio access network (RAN) server, wherein the RAN server is connected to a fifth generation mobile communications technology (5G) core network by using an interface, the RAN server is configured to manage base stations of a plurality of wireless communications standards, and the RAN server comprises a receiver and a transmitter:
the receiver is configured to receive an attach request message that is from a terminal apparatus and forwarded by a first base station, wherein the first base station is one of the base stations of the plurality of wireless communications standards;
the transmitter is configured to send the attach request message to the 5G core network by using the interface;
the receiver is further configured to receive, by using the interface, an attach accept message returned by the 5G core network in response to the attach request message; and
the transmitter is further configured to send the attach accept message to the terminal apparatus by using a second base station, wherein the second base station is one of the base stations of the plurality of wireless communications standards.

2. The RAN server according to claim 1, wherein
the receiver is further configured to receive a Radio Resource Control (RRC) connection reconfiguration complete message that is from the terminal apparatus and forwarded by a third base station, wherein the RRC connection reconfiguration complete message is sent by the terminal apparatus after the terminal apparatus receives an RRC connection reconfiguration message carrying the attach accept message, and the third base station is one of the base stations of the plurality of wireless communications standards;
the transmitter is further configured to: after the receiver receives the RRC connection reconfiguration complete message, send an initial context setup response message to the 5G core network by using the interface;
the receiver is further configured to receive an attach complete message that is from the terminal apparatus and forwarded by a fourth base station, wherein the fourth base station is one of the base stations of the plurality of wireless communications standards; and
the transmitter is further configured to send the attach complete message to the 5G core network by using the interface, wherein the terminal apparatus is attached to the 5G core network in response to the attach complete message.

3. The RAN server according to claim 2, wherein the attach request message, the attach accept message, and the attach complete message comprise a tracking area identity (TAI) of the terminal apparatus; and
the TAI is one of an identifier of the RAN server or a preset value that is unrelated to a wireless communications standard of a base station.

4. The RAN server according to claim 2, wherein the RAN server further comprises a processor;
the receiver is further configured to receive a service request that is from the terminal apparatus and forwarded by a fifth base station, wherein the fifth base station is one of the base stations of the plurality of wireless communications standards; and
the processor is configured to allocate, to the terminal apparatus, a sixth base station responsible for processing the service request, wherein the sixth base station is one of the base stations of the plurality of wireless communications standards.

5. The RAN server according to claim 1, wherein the RAN server is connected to an evolved packet core (EPC) network by using an S1 interface, and the attach request message carries a capability of the terminal apparatus;
and wherein the transmitter is configured to:
if the capability of the terminal apparatus indicates that the terminal apparatus supports a new radio access (NR) wireless communications standard, send the attach request message to the 5G core network by using the interface; or
if the capability of the terminal apparatus indicates that the terminal apparatus supports only a Long Term Evolution (LTE) wireless communications standard, send the attach request message to the EPC network by using the S1 interface.

6. The RAN server according to claim 1, wherein the RAN server is configured to implement functions of an access adaptation layer, an RRC layer, an Internet Protocol (IP) layer, and the access adaptation layer has a function of allocating, to the terminal apparatus, a base station responsible for processing a service request, a function of managing a tracking area list, and a function of paging when the terminal apparatus initiates the service request.

7. The RAN server according to claim 1, wherein the interface is a newly-defined interface, or the interface is an S1 interface.

8. A wireless communications system, comprising at least one radio access network (RAN) server, a fifth generation mobile communications technology (5G) core network, and base stations of a plurality of wireless communications standards, wherein
   the RAN server is connected to the 5G core network by using an interface, the RAN server is configured to manage the base stations of the plurality of wireless communications standards, and the RAN server comprises a receiver and a transmitter:
   the receiver is configured to receive an attach request message that is from a terminal apparatus and forwarded by a first base station, wherein the first base station is one of the base stations of the plurality of wireless communications standards;
   the transmitter is configured to send the attach request message to the 5G core network by using the interface;
   the receiver is further configured to receive, by using the interface, an attach accept message returned by the 5G core network in response to the attach request message; and
   the transmitter is further configured to send the attach accept message to the terminal apparatus by using a second base station, wherein the second base station is one of the base stations of the plurality of wireless communications standards;
   the base stations of the plurality of wireless communications standards are configured to forward an attach request message from a terminal apparatus to the RAN server; and
   the 5G core network is configured to return, when receiving the attach request message sent by the RAN server, an attach accept message to the RAN server.

9. The wireless communications system according to claim 8, wherein the RAN server is further configured to: manage a tracking area list, deliver the tracking area list, and generate security contexts of the base stations of the plurality of wireless communications standards.

10. A terminal apparatus attach method, comprising:
   receiving, by a radio access network (RAN) server, an attach request message that is from a terminal apparatus and forwarded by a first base station, wherein the RAN server is connected to a fifth generation mobile communications technology (5G) core network by using an interface, the RAN server is configured to manage base stations of a plurality of wireless communications standards, and the first base station is one of the base stations of the plurality of wireless communications standards;
   sending, by the RAN server, the attach request message to the 5G core network by using the interface;
   receiving, by the RAN server by using the interface, an attach accept message returned by the 5G core network in response to the attach request message; and
   sending, by the RAN server, the attach accept message to the terminal apparatus by using a second base station, wherein the second base station is one of the base stations of the plurality of wireless communications standards.

11. The method according to claim 10, wherein the method further comprises:
   receiving, by the RAN server, a Radio Resource Control (RRC) connection reconfiguration complete message that is from the terminal apparatus and forwarded by a third base station, wherein the RRC connection reconfiguration complete message is sent by the terminal apparatus after the terminal apparatus receives an RRC connection reconfiguration message carrying the attach accept message, and the third base station is one of the base stations of the plurality of wireless communications standards;
   after receiving the RRC connection reconfiguration complete message, sending, by the RAN server, an initial context setup response message to the 5G core network by using the interface;
   receiving, by the RAN server, an attach complete message that is from the terminal apparatus and forwarded by a fourth base station, wherein the fourth base station is one of the base stations of the plurality of wireless communications standards; and
   sending, by the RAN server, the attach complete message to the 5G core network by using the interface, wherein the terminal apparatus is attached to the 5G core network in response to the attach complete message.

12. The method according to claim 11, wherein the attach request message, the attach accept message, and the attach complete message comprise a tracking area identity (TAI) of the terminal apparatus; and
   the TAI is one of an identifier of the RAN server or a preset value unrelated to a wireless communications standard of a base station.

13. The method according to claim 11, wherein after the terminal apparatus is attached to the 5G core network, and the method further comprises:
   receiving, by the RAN server, a service request that is from the terminal apparatus and forwarded by a fifth base station, wherein the fifth base station is one of the base stations of the plurality of wireless communications standards; and
   allocating, by the RAN server to the terminal apparatus, a sixth base station responsible for processing the service request, wherein the sixth base station is one of the base stations of the plurality of wireless communications standards.

14. The method according to claim 10, wherein the RAN server is connected to an evolved packet core (EPC) network by using an S1 interface, and the attach request message carries a capability of the terminal apparatus; and the method comprises:
   determining, by the RAN server based on the capability of the terminal apparatus carried in the attach request message, whether the terminal apparatus supports a new radio access (NR) wireless communications standard or the terminal apparatus supports only a Long Term Evolution (LTE) wireless communications standard; and
   performing one of the following operations:
      if the RAN server determines, based on the capability of the terminal apparatus carried in the attach request message, that the terminal apparatus supports the NR wireless communications standard, sending, by the RAN server, the attach request message to the 5G core network by using the interface; or
      if the RAN server determines, based on the capability of the terminal apparatus carried in the attach request message, that the terminal apparatus supports only the LTE wireless communications standard, sending the attach request message to the EPC network by using the S1 interface.

15. The method according to claim 10, wherein the interface is a newly-defined interface, or the interface is an S1 interface.

* * * * *